United States Patent [19]
Kwon

[11] Patent Number: 5,771,162
[45] Date of Patent: Jun. 23, 1998

[54] ELECTRIC PROTECTIVE DEVICE USED IN SWITCHING MODE POWER SUPPLY SYSTEMS

[75] Inventor: Joong-Gi Kwon, Suwon, Rep. of Korea

[73] Assignee: SamSung Electronics Co., Ltd., Suwon, Rep. of Korea

[21] Appl. No.: 840,699

[22] Filed: Apr. 25, 1997

[30] Foreign Application Priority Data

Apr. 25, 1996 [KR] Rep. of Korea ................... 1996/12807

[51] Int. Cl.⁶ .................................................. H02H 7/122
[52] U.S. Cl. .............................................. 363/56; 363/97
[58] Field of Search ................................ 363/20, 21, 50, 363/55, 56, 97, 131

[56] References Cited

U.S. PATENT DOCUMENTS

| | | | |
|---|---|---|---|
| 4,595,977 | 6/1986 | vonder Ohe | 363/56 |
| 4,709,320 | 11/1987 | Konopka | 363/56 |
| 4,802,076 | 1/1989 | Asai | 363/97 X |
| 4,843,532 | 6/1989 | Freedman | 363/56 X |
| 4,914,560 | 4/1990 | Oh et al. | 363/56 |
| 5,001,373 | 3/1991 | Bator et al. | 363/56 X |
| 5,029,269 | 7/1991 | Eilliott et al. | 363/21 |
| 5,088,018 | 2/1992 | Lee | 363/56 |
| 5,130,561 | 7/1992 | Elliott et al. | 363/56 X |
| 5,216,587 | 6/1993 | Miyazaki et al. | 363/56 |
| 5,400,236 | 3/1995 | Shimizu et al. | 363/56 X |
| 5,416,689 | 5/1995 | Silverstein et al. | 363/56 |
| 5,440,473 | 8/1995 | Ishii et al. | 363/21 |
| 5,479,329 | 12/1995 | Motonobu et al. | 363/21 X |

*Primary Examiner*—Peter S. Wong
*Assistant Examiner*—Y. J. Han
*Attorney, Agent, or Firm*—Robert E. Bushnell, Esq.

[57] ABSTRACT

A protective device used in switching mode power supply protects the supply during abnormal conditions, such as undervoltage or overvoltage resulting from power supply conditions inconsistent with the rated power supply conditions. During such abnormal conditions, this protective device is operated in a manner that an interrupt generator detects such a condition and interrupts the operation of the supply using an interrupt signal.

10 Claims, 3 Drawing Sheets

ELECTRIC PROTECTIVE DEVICE USED IN SWITCHING MODE POWER SUPPLY SYSTEMS

CLAIM OF PRIORITY

This application makes reference to, incorporates the same herein, and claims all benefits accruing under 35 U.S.C. §119 from an application for AN ELECTRIC PROTECTIVE DEVICE USED IN SWITCHING MODE POWER SUPPLY SYSTEMS earlier filed in the Korean Industrial Property Office on the 25th day of Apr. 1996 and there duly assigned Ser. No. 12807/1996, a copy of which application is annexed hereto.

BACKGROUND OF THE INVENTION

1. Field of the Invention

The present invention relates generally to a protective device used in a switching mode power supply, and in particular to a protective device in which an interrupt generator detects abnormal conditions such as an undervoltage or overvoltage inconsistent with the rated power supply conditions and interrupts the operation of the supply by means of an interrupt signal so as to protect the supply during such abnormal conditions.

2. Description of the Related Art

An ideal switching mode power supply (SMPS) is an electronic circuit designed to generate power in which ripple is removed by switching a switching circuit in response to a pulse-width modulated (PWM) signal and to provide electronic equipment with the resultant power of good quality for their operation. This can offer the benefits of small size, light weight, high performance and an efficient configuration as compared with a linear power supply, and hence research and development has been pursued on such a switching mode power supply in compliance with today's demand for the production of power supplies which have a minimum size and weight, and a low power consumption.

In general, there are three types of switching mode power supplies: a 110 V type, a 220 V type and a free voltage type. The 220 V switching mode power supply is constructed in a different manner from that of the 110 V switching mode power supply because its elements are relatively expensive, and the free voltage switching mode power supply is similar to the 220 V switching mode power supply in circuitry and individual elements.

An earlier 110 V switching mode power supply system includes a protection circuit having a fuse and choke coils and a capacitor for reducing noise and preventing an overcurrent from flowing through the system, a first rectifier for converting an AC voltage from the protection circuit into a DC voltage and for removing ripple from the DC voltage, an AC voltage generator for generating an AC voltage of a high frequency by switching the DC voltage from the first rectifier at a high speed in response to a pulse width modulated signal, and a second rectifier for rectifying the AC voltage from the AC voltage generator into a DC voltage.

The AC voltage generator includes a pulse width modulated signal generator for generator a Pulse width modulated signal of a high frequency in response to a voltage supplied from a power line, a voltage converter for converting a DC voltage delivered to a coil of a high frequency transformer into an AC voltage of a high frequency after turning on a transistor according to the Pulse width modulated signal from the Pulse width modulated signal generator and a voltage divider for supplying a voltage to the Pulse width modulated signal generator to energize it.

When 110 VAC is supplied to the protection circuit through the fuse, the noise-ridden AC voltage is filtered by the coil and capacitor and then applied to the first rectifier. The first rectifier performs full wave rectification and smooths the input AC voltage by means of a bridge diode and a capacitor and supplies the resultant DC voltage to the AC voltage generator. Simultaneously, the Pulse width modulated signal generator of the AC voltage generator receives the voltage from the voltage divider and outputs a signal which controls the pulse width modulation. As the pulse width modulated control signal is then supplied to the voltage converter, the on and off operations of the transistor are implemented repeatedly, thereby converting the DC voltage delivered to the coil of the high frequency transformer into an AC voltage.

This pulse width modulated control signal of the pulse width modulated signal generator enables a stable switching operation of a transistor so that the AC voltage generated at the primary coil of the high frequency transformer is induced in a secondary coil of the transformer and is converted into a DC voltage by means of the rectifier diode and the smoothing capacitor of the second rectifier. When 110 V is supplied to the 220 V switching mode power supply the elements of the system may be damaged by a current exceeding the rated current. Alternatively, when 220 V is supplied to the 110 V switching mode power supply the elements of the system can be damaged by a voltage exceeding the rated voltage.

The Oh et al. patent, U.S. Pat. No. 4,914,560 entitled *Protection Circuit For Switching Mode Power Supply Circuit*, discloses a protection circuit for switching a switching mode power supply circuit which outputs a constant voltage. The protection circuit interrupts the on/off switching operation of the switching transistor when an overvoltage state is detected. The von der Ohe patent, U.S. Pat. No. 4,595,977, entitled *Switched Mode Power Supply*, discloses a switching mode power supply in which a protective circuit is provided to stop the operation of the switching circuit upon the detection of an ove voltage.

The Freedman patent, U.S. Pat. No. 4,843,532 entitled *Regulating Pulse Width Modulator For Power Supply With High Speed Shutoff*, discloses a switching mode power supply in which the pulse width modulator shuts down upon the detection of an overvoltage. Silverstein et al., U.S. Pat. No. 5,416,689 entitled *Current Mode Switching Power Supply Overload Protection Circuit With False Fault Condition Screening*, discloses a current mode switching power supply overload protection circuit which shuts down the switching circuit upon the detection of an overvoltage. Elliott et al., U.S. Pat. No. 5,029,269, entitled *Delayed Power Supply Overvoltage Shutdown Apparatus*, discloses a switching mode power supply which shuts down the pulse width modulator upon the detection of an overvoltage.

The following additional patents each disclose features in common with the present invention but are not believed to be as pertinent as the patents noted above. U.S. Pat. No. 4,709,320 to Konopka, entitled *Low Voltage Shutdown Circuit*, U.S. Pat. No. 5,216,587 Miyazaki et al., entitled *Inverter*, U.S. Pat. No. 5,130,561 to Elliott et al., entitled *Switching Mode Power Supplies With Controlled Synchronization*, U.S. Pat. No. 5,088,018 to Lee, entitled *Overvoltage protection Power Supply Circuit*, U.S. Pat. No. 5,479,329 to Motonobu et al., entitled *Switching Power Supply Having Output Terminal Disconnection Detecting Circuit*, U.S. Pat. No. 5,440,473 to Ishii et al., entitled *AC-DC Converter*, U.S. Pat. No. 5,400,236 to Shimizu et al., entitled *Inventor-Controlled Power Unit*, and U.S. Pat. No.

4,802,076 to Asai, entitled *Switching Regulator Type Power Supply Circuit.*

SUMMARY OF THE INVENTION

The present invention is proposed to provide an improved switching mode process and power supply.

It is another object to provide a protective device used in a switching mode power supply, capable of protecting elements of the supply by interrupting the operation of the switching mode power supply when abnormal conditions such as an undervoltage or overvoltage inconsistent with the rated conditions of the supply are detected.

These and other objects, according to one aspect of the present invention, may be achieved with a protective device detects when an abnormal input condition exceeding the rated input condition has occurred, generates an interrupt signal and interrupts the operation of the pulse width modulated signal generator, resulting in an interruption of the operation of the supply.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
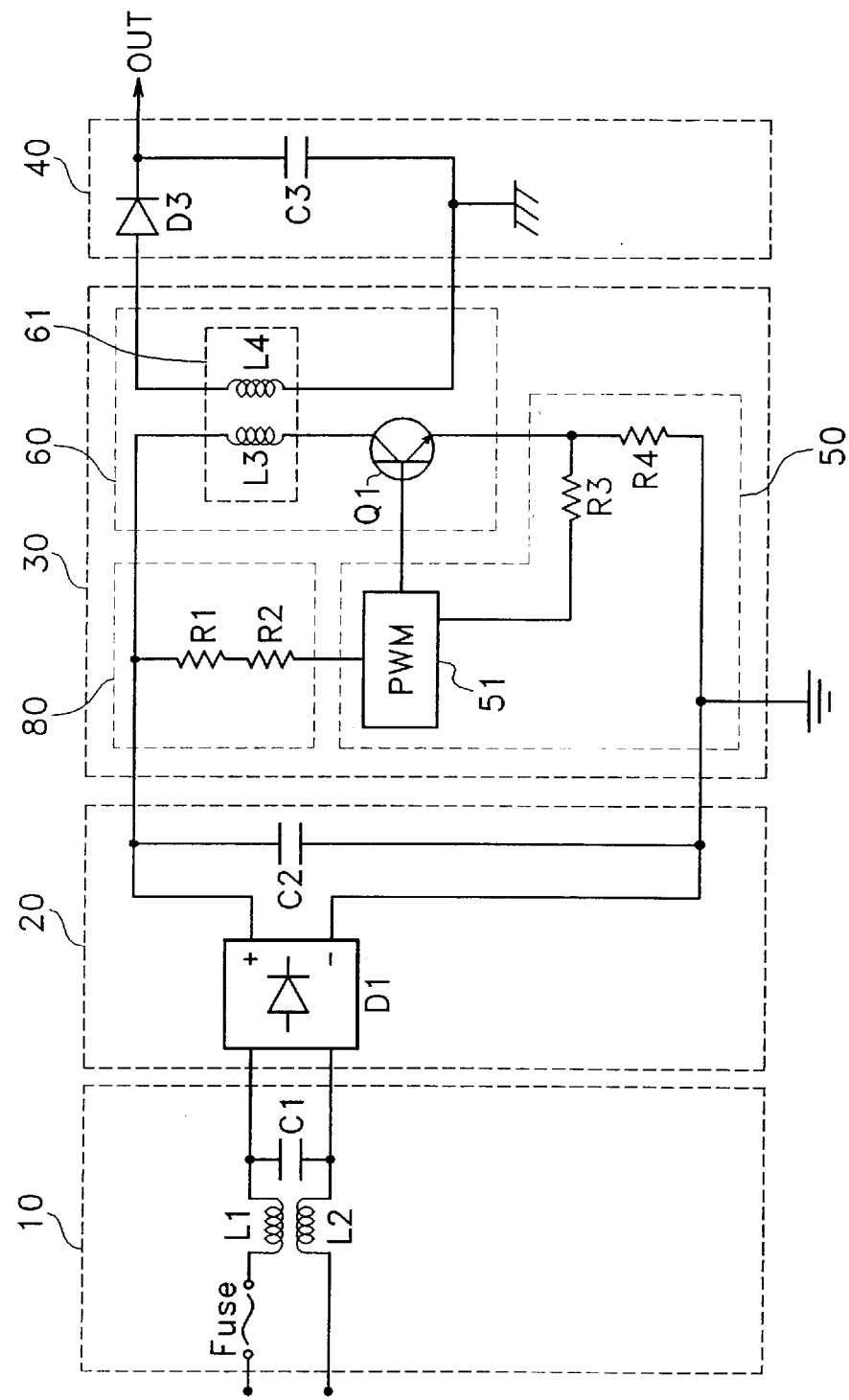
FIG. 1 is a circuit diagram of a representation of an earlier design for a hypothetical 110 V switching mode power supply system.

Referring to FIG. 1, there is shown an earlier 110 V switching mode power supply system constructed with a protection circuit 10 including a fuse, choke coils L1 and L2 and a capacitor C1 for reducing noise and preventing an overcurrent from flowing through the system, a first rectifier 20 for converting an AC voltage from the protection circuit 10 into an essentially DC voltage and for removing ripple from the DC voltage, an AC voltage generator 30 for generating an AC voltage of a high frequency by switching the DC voltage from the first rectifier 20 at a high speed in response to a pulse-width modulated signal, and a second rectifier 40 for rectifying the AC voltage from the AC voltage generator 30 into a DC voltage.

The AC voltage generator 30 is comprised of a pulse width modulated signal generator 50 including pulse width modulator 51 and resistance R3 and R4 for generating a Pulse width modulated signal of a high frequency in response to a voltage supplied from a not shown auxiliary power line, a voltage converter 60 for converting a DC voltage delivered to a coil L3 of a high frequency transformer 61 into an AC voltage of a high frequency after turning on a transistor Q1 according to the pulse width modulated signal from the pulse width modulated signal generator 50, and a voltage divider 80 for supplying a voltage to the pulse width modulated signal generator 50 to energize it.

The operation of the thus constructed 110 V switching mode power supply is described below with reference to FIG. 1. Provided that 110 V AC voltage is firstly supplied to the protection circuit through the fuse, the noise-ridden AC voltage is filtered by the coils L1 and L2 and capacitor C1 and then outputted to the first rectifier 20.

The first rectifier 20 performs full-wave rectification and smoothing for the input AC voltage by means of a bridge diode D1 and a capacitor C2, and supplies the resultant DC voltage to the AC voltage generator 30. At the same time, the pulse width modulated signal generator 50 of the AC voltage generator 30 receives the voltage from the voltage divider 80 through two resistors R1 and R2 and outputs a signal which controls the pulse-width modulation.

As the pulse width modulated control signal is then supplied to the voltage converter 60, the on and off operations of the transistor Q1 are implemented repeatedly, thereby converting the DC voltage delivered to the coil L3 of the high frequency transformer 61 into an AC voltage. This pulse width modulated control signal of the pulse width modulated signal generator 50 enables a stable switching operation of the transistor Q1, so that the AC voltage generated at the primary coil L3 of the high frequency transformer 61 is induced in a secondary coil L4 of the transformer 61 and is converted into a DC voltage by means of the rectifier diode D3 and the smoothing capacitor C3 of the second rectifier 40.

The 220 V switching mode power supply and free volt switching mode power supply are approximately similar to the 110 V switching mode power supply in construction and function of each circuit, except that the kinds of respective parts only differ, so the description of those systems have been omitted. However, when 10 Vis supplied to the 220 V switching mode power supply, it is frequently encountered that the elements of the system are damaged by a current exceeding the rated current. On the other hand, when 220 V is supplied to the 110 V switching mode power supply the elements of the system can be damaged by a voltage exceeding the rated voltage.

Figure 2:
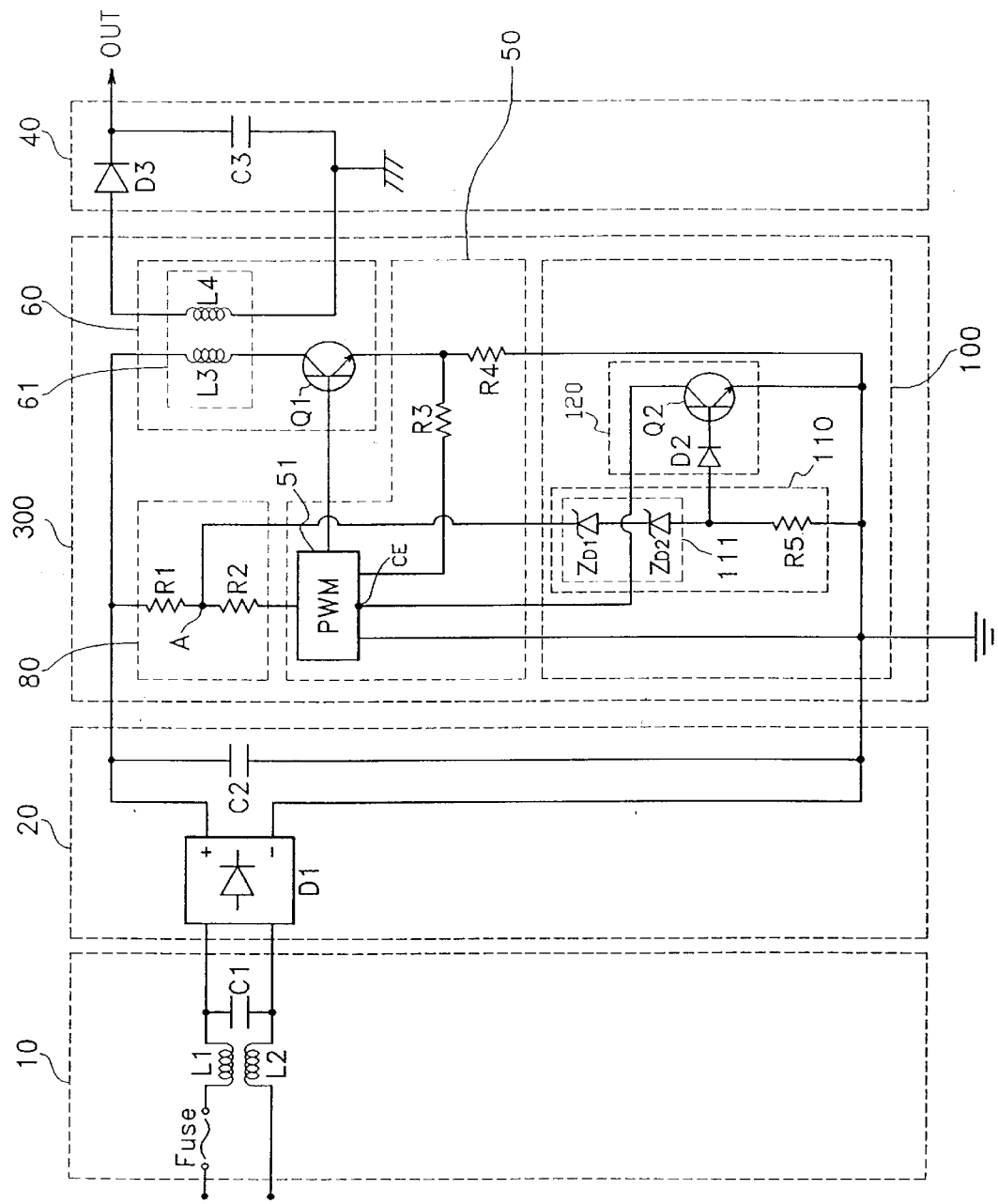
FIG. 2 is a circuit diagram of a 110 V switching mode power supply system having an interrupter constructed in accordance with the principles of the present invention.

FIG. 2 illustrates circuitry of a 110 V switching mode power supply having an interrupter. As shown in this view, the circuitry is similar to that of FIG. 1 except for the AC voltage generator 300 which replaces the generator 30 of FIG. 1, so the following description relates only to the AC voltage generator 300 for simplification of the description.

The AC voltage generator 300 is comprised of a pulse width modulated signal generator 50 which generates a pulse width modulated control signal of a high frequency using a voltage generated from an auxiliary power supply not shown, a voltage converter 60 which generates an AC voltage of a high frequency by switching a DC voltage depending upon the Pulse width modulated control signal from the pulse width modulated signal generator 50, a voltage divider 80 which supplies a voltage to the pulse width modulated signal generator 50 to energize it, and an interrupter 100 which detects the voltage from the voltage divider 80 and generates an interrupt signal when the detected voltage is higher than a reference voltage so as to interrupt the operation of the pulse width modulated signal generator 50.

The interrupter 100 is connected to the voltage divider 80 and is comprised of an abnormal voltage detector 110 for detecting whether or not a voltage higher than the reference voltage has been inputted, and a switching circuit 120 which is tuned on and off in response to the signal from the detector 110, functioning as a control signal, so as to either enable or disable the operation of the pulse width modulated signal generator 50.

The abnormal voltage detector 110 includes a Zener diode portion 111 which is turned on if the output of the voltage divider 80 is greater than a Zener voltage, and a resistance R5, having one terminal connected to the Zener diode portion 111 and having another terminal connected to ground, which divides the voltage which will be supplied to the switching circuit 120.

The Zener diode portion 111 includes a first Zener diode ZD1 and a second Zener diode ZD2, the first Zener diode ZD1 having a cathode which is connected to the voltage divider 80 and having an anode which is connected to the second Zener diode ZD2. The two diodes determine the reference voltage as mentioned in the above.

The switching circuit 120 includes an NPN transistor Q2 having a collector which is connected to an enable terminal CE of the Pulse width modulated element 51 performing the pulse-width modulation, a base which is connected to a connection point of the second Zener diode ZD2 and the resistance R5 through a cathode of a diode D2, and an emitter which is connected to ground.

The operation of such a 110 V SMTS is described below in detail with reference to FIG. 2. Provided that 110 V AC voltage is firstly supplied to the protection circuit 10 through the fuse, the noise-ridden AC voltage is filtered by the coils L1 and L2 and capacitor C1 and then outputted to the first rectifier 20. The first rectifier 20 performs full-wave rectification and smoothing for the input AC voltage by means of a bridge diode D1 and a capacitor C2, and supplies the resultant DC voltage to the AC voltage generator 300.

After the DC voltage is supplied to the AC voltage generator 300, it is reduced by the resistance of the voltage divider 80 which supplies a voltage to the pulse width modulated signal generator 50 to energize it, and the lowered voltage is supplied to the abnormal voltage detector 110. The abnormal voltage detector 110 judges whether or not the input voltage is higher than the reference voltage and then supplies a signal to the switching circuit 120 in response thereto. Responsive to the signal voltage from the abnormal voltage detector 110, on or off operation of the switching circuit 120 is implemented, either disabling or enabling the operation of the pulse width modulated signal generator 50. In more detail, the Zener diode portion 111 having two Zener diodes ZD1 and ZD2, is turned on when the output of the voltage divider 80 is higher than the combined Zener voltage used as the reference voltage. The resistance R5 divides the voltage of the switching circuit 120 and the divided voltage is supplied to the gate of the NPN transistor Q2 of the switching circuit 120, turning on or off the NPN transistor Q2. This on or off operation causes the enable terminal CE of the pulse width modulated element 51 to be in a low or high state, disabling or enabling the operation of the pulse width modulated signal generator 50.

In a normal state, the Zener voltage of the Zener diode portion 111 is set to a value capable of maintaining the voltage supplied to the gate of the transistor Q2 in a low state, so that the transistor Q2 is turned off and the normal operation of the pulse width modulated signal generator or 50 is implemented. However, when an overvoltage of 220 V is supplied to the input terminal of this 110 V switching mode power supply during a normal operation, the voltage of the voltage divider 80 increases and is supplied to the gate of the transistor Q2, turning on the transistor Q2. Consequently, the pulse width modulated signal generator 50 is interrupted and its operation is disabled. Thereafter, the transistor Q1 of the voltage converter 60 is turned off, interrupting the switching operation of the voltage converter 60 which converts the AC voltage delivered to the coil L3 into a DC voltage. Accordingly, when an abnormal voltage is supplied to the supply, the operation of the supply is interrupted in the above-mentioned manner and hence the elements of the supply can be safely protected from overvoltage-incurred damage.

Figure 3:
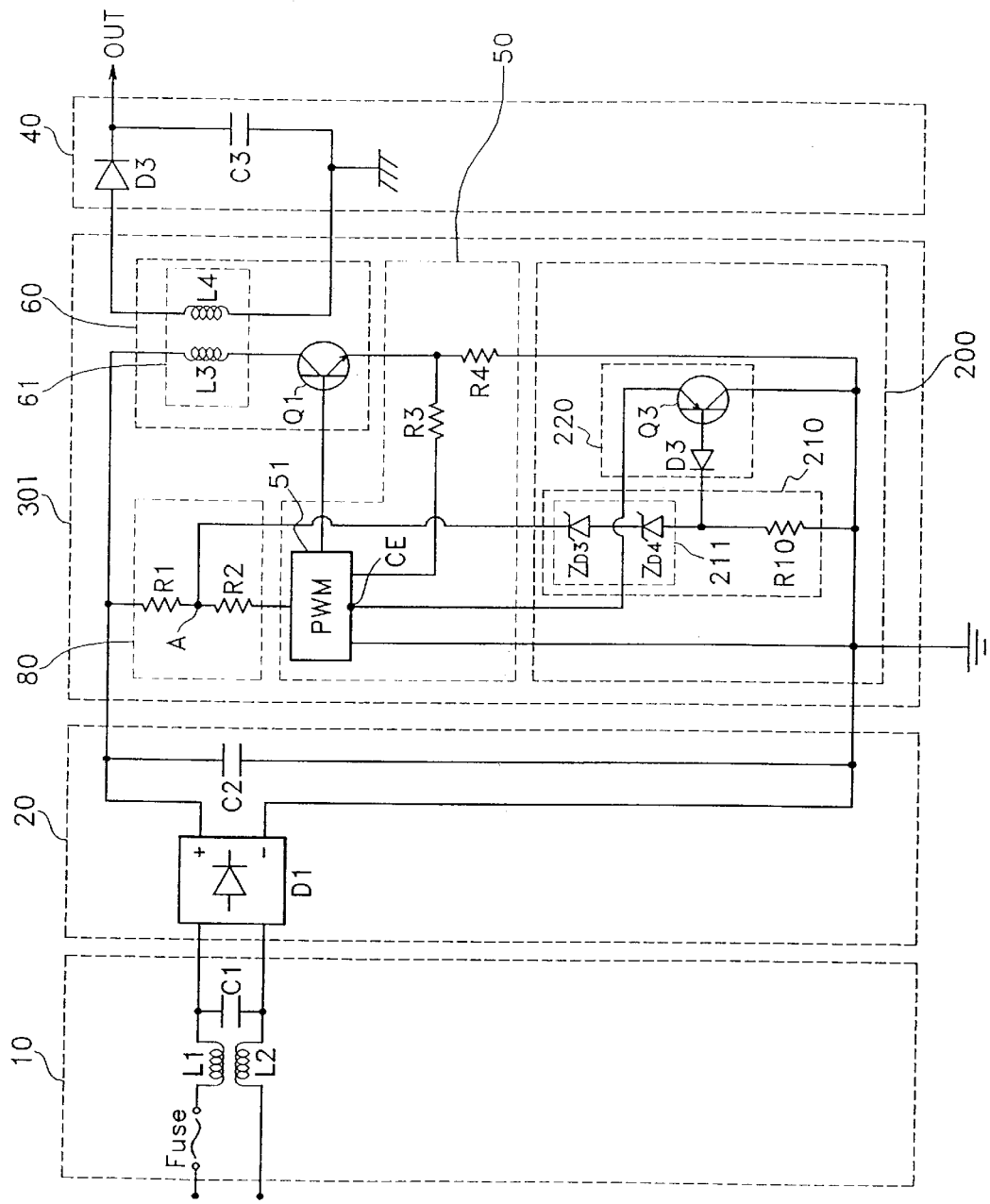
FIG. 3 is a circuit diagram of a 220 V switching mode power supply system having an interrupter constructed in accordance with the principles of the present invention.

The operation of 220 V switching mode power supply system is described below with reference to FIGS. 1 and 3. As shown in FIG. 3, the 220 V switching mode power supply of this invention is similar to the preceding 110 V switching mode power supply in construction, function and effect, so a discussion of similar elements have been omitted for simplification of the description and a different part, interrupter 200, replacing interrupter 100, is only described below.

In the 220 V switching mode power supply system, an interrupter 200 is connected to the voltage divider 80 and is comprised of an abnormal voltage detector 210 for detecting whether or not a voltage higher than the reference voltage has been supplied, and a switching circuit 220 which is turned on and off in response to the signal from the abnormal voltage detector 210, functioning as a control signal, so as to either enable or disable the operation of the pulse width modulated signal generator 50.

The abnormal voltage detector 210 includes a Zener diode portion 211 which is turned off so when the output of the voltage divider 80 is lower than a Zener voltage, and a resistance R10, having one terminal which is connected to the Zener diode portion 211 and having another terminal connected to ground, which divides the voltage which will be supplied to the switching circuit 220.

The Zener diode portion 211 includes a third Zener diode ZD3 and a fourth Zener diode ZD4, the third Zener diode ZD3 having a cathode which is connected to the voltage divider 80 and having an anode which is connected to the fourth Zener diode ZD4. The two diodes determine the reference voltage as mentioned in the above.

The switching circuit 220 includes a PNP transistor Q3 having an emitter which is connected to an enable terminal CE of the pulse width modulated element 51 performing the pulse-width modulation, a base which is connected to a connection point of the fourth Zener diode ZD4 and resistance R10 through a cathode of a diode D3, and a collector which is connected to ground.

The operation of such a 220 V switching mode power supply is described below in detail with reference to FIG. 3. When a DC voltage is supplied to the AC voltage generator 30 from the first rectifier 20, the magnitude of the voltage is reduced by the resistance of the voltage divider 80 which supplies a voltage to the pulse width modulated signal generator 50 to energize it, and the lowered voltage is supplied to the abnormal voltage detector 210. The abnormal voltage detector 210 judges whether or not the input voltage is lower than the reference voltage and then supplies a signal to the switching circuit 220 in response thereto.

Responsive to the signal voltage from the abnormal voltage detector 210, on or off operation of the switching circuit 220 is performed, either disabling or enabling the operation of the pulse width modulated signal generator 50. In more detail, the Zener diode portion 211 having two Zener diodes ZD3 and ZD4 is turned off when the output of the voltage divider 80 is lower than the Zener voltage used as the reference voltage. The resistance R10 thereof divides the voltage of the switching circuit 220 and the divided voltage is supplied to a gate of the PNP transistor Q3 of the switching circuit 220, turning on or off the PNP transistor Q3. This on or off operation causes the enable terminal CE of the pulse width modulated element 51 to be in a low or high state, disabling or enabling the operation of the pulse width modulated signal generator 50.

In a normal state, the Zener voltage of the Zener diode portion 211 is set to a value capable of maintaining the voltage supplied to the gate of the NPN transistor Q3 at a high state, so that the transistor Q3 is turned off and the normal operation of the Pulse width modulated signal generator 50 is implemented.

However, when the undervoltage of 110 V is supplied to the input terminal of this 220 V switching mode power supply during a normal operation, the voltage of the voltage divider 80 is lowered and no voltage is supplied to the gate of the transistor Q3 from the voltage divider 80, turning on the transistor Q3. Consequently, pulse width modulated signal generator 50 becomes enabled. Thereafter, the transistor Q1 of the voltage converter 60 is turned off, interrupting the switching operation of the voltage converter 60 which converts the AC voltage delivered to the coil L3 into a DC voltage.

Accordingly, when abnormal power (e.g., an undervoltage) is supplied to the system, the operation of the switching mode power supply system is interrupted in the above-mentioned manner and hence the elements of the system can be safely protected from damage. In addition, the NPN and PNP transistors which act as a switching element in this invention can be replaced by N-channel and P-channel field effect transistors (FET), respectively, and it is also possible to replace them with relays or other elements capable of switching. Such modifications of these transistors are feasible within the scope of this invention.

As mentioned above, this invention has many advantages in that damage to the switching mode power supply which occurs when the improper power is supplied to the system can be prevented by interrupting the operation of the switching mode power supply system in such a case, and the manufacturing costs is relatively low.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An electric protective device used in switching mode power supply system which rectifies an AC voltage into a DC voltage and performs a switching operation to supply power to electric equipment, the electric protective device comprising:

a pulse-width modulator for switching the DC voltage resulting from rectification on and off, in response to a pulse width modulated signal; and an interrupt generator for generating an interrupt signal interrupting operation of said pulse width modulator when said DC voltage is higher than a reference voltage;

said interrupt generator comprising:

an abnormal voltage detector for detecting whether said DC voltage is higher than the reference voltage and for outputting a signal in response thereto; and a switching means for generating said interrupt signal so as to interrupt the operation of said pulse width modulator when on in response to said signal outputted from said abnormal voltage detector; and said abnormal voltage detector comprising:

a Zener diode part including at least one Zener diode for determining said reference voltage; and a resistance, having one terminal connected to said Zener diode and having another terminal connected to ground, for dividing a voltage supplied to said switching means.

2. The device of claim 1, said switching means comprising:

a switch having an input terminal connected to an enable terminal of said pulse width modulator, a control terminal connected to a connection point of said Zener diode part and said resistance through a cathode of a diode, and an output terminal connected to a local reference potential.

3. The device of claim 2, said switch comprising a field effect transistor, having a source electrode comprising said input terminal connected to said enable terminal of said pulse width modulator, a gate electrode comprising said control terminal connected to said connection point of said Zener diode part and said resistance through a cathode of a diode, and a drain electrode comprising said output terminal connected to said local reference potential.

4. The device of claim 2, with said switch comprising a relay.

5. The device of claim 1, said switching means comprising:

an NPN transistor having an emitter electrode connected to an enable terminal of said pulse width modulator, a base electrode connected to a connection point of said Zener diode part and said resistance through a cathode of a diode, and a collector electrode connected to a local reference potential.

6. An electric protective device used in switching mode power supply system which rectifies an AC voltage into a DC voltage and performs a switching operation to supply power to electric equipment, the electric protective device comprising:

a pulse-width modulator for switching the DC voltage resulting from rectification on and of, in response to a pulse width modulated signal; and an interrupt generator for generating an interrupt signal which interrupts the operation of said pulse width modulator when said DC voltage is lower than a reference voltage;

said interrupt generator comprising:

an abnormal voltage detector for detecting whether said DC voltage is lower than the reference voltage and for outputting a signal in response thereto; and a switching means for generating said interrupt signal so as to interrupt the operation of said pulse width modulated in response to said signal outputted from said abnormal voltage detector; and said abnormal voltage detector comprising:

a Zener diode part including at least one Zener diode for determining said reference voltage; and a resistance, having one terminal connected to said Zener diode and having another terminal connected to ground, for dividing a voltage supplied to said switching means.

7. The device of claim 6, said switching mean comprising:

a switch having an input terminal connected to an enable terminal of said pulse width modulator, a control terminal connected to a connection point of said Zener diode part and said resistance through a cathode of a diode, and an output terminal connected to a local reference potential.

8. The device of claim 7, said switch comprising a field effect transistor having a drain electrode comprising said input terminal connected to said enable terminal of said pulse width modulator, a gate comprising said control terminal connected to said connection point of said Zener diode part and said resistance through a cathode of a diode, and a source electrode comprising said output terminal connected to said local reference potential.

9. The device of claim 7, said switch comprising a relay.

10. The device of claim 6, said switching means comprising:
a PNP transistor having an emitter electrode connected to an enable terminal of said pulse width modulator, a base electrode connected to a connection point of said Zener diode part and said resistance through a cathode of a diode, and a collector electrode connected to a local reference potential.

* * * * *